G. H. ULRICH.
CLOTHES DRAINER.
APPLICATION FILED JULY 12, 1915.
1,192,246.
Patented July 25, 1916.
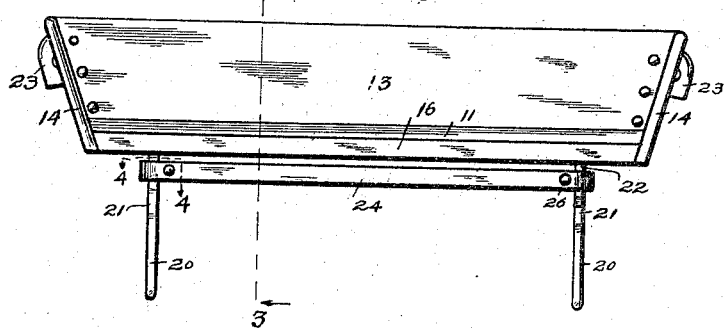
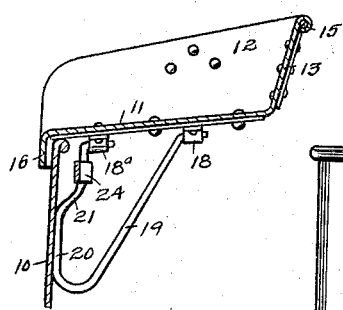
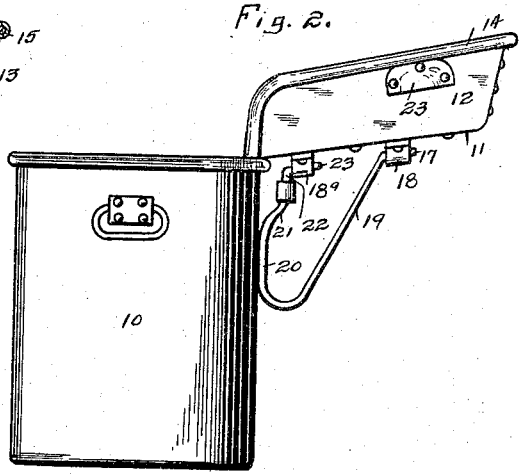
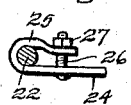
Witnesses
Will Freeman
A. G. Hague
Inventor
George H. Ulrich
By Onwig & Bair
Attorneys

UNITED STATES PATENT OFFICE.

GEORGE H. ULRICH, OF FARLIN, IOWA.

CLOTHES-DRAINER.

1,192,246.   Specification of Letters Patent.   Patented July 25, 1916.

Application filed July 12, 1915. Serial No. 39,483.

*To all whom it may concern:*

Be it known that I, GEORGE H. ULRICH, a citizen of the United States, and resident of Farlin, in the county of Greene and State of Iowa, have invented a certain new and useful Clothes-Drainer, of which the following is a specification.

The object of my invention is to provide a drain pan for wash-boilers and the like of simple, durable and inexpensive construction.

More particularly it is my purpose to provide a drain pan adapted to be quickly and easily detachably mounted on a wash-boiler or receptacle of the general type, for holding clothes or the like for draining the water therefrom back in the boiler or other receptacle.

A further object is to provide such a device so constructed that in one position of certain of its parts it may be firmly mounted and secured on the wash-boiler or the like, while in another position of the parts, the drain pan may be nested and the back or supporting parts folded into position for occupying a minimum of space for storage and transportation.

Still a further object is to provide such a drain pan having a part adapted to engage one side of a wash-boiler or the like, and having a movable part adapted to engage the other side, and having also a detachable brace member adapted to connect said movable parts for rigidly holding them in position when the drain pan is installed for use.

My invention consists in the construction, arrangement and combination of the various parts of the device whereby the objects contemplated are attained as hereinafter more fully set forth, pointed out in my claims and illustrated in the accompanying drawings, in which:

Figure 1 shows a front elevation of a drain pan embodying my invention. Fig. 2 shows a side elevation of the same installed on a wash-boiler. Fig. 3 shows a vertical sectional view taken on the line 3—3 of Fig. 1, and Fig. 4 shows a horizontal sectional view through one of the hinged brackets, showing the construction of one end of the connecting brace, the view being shown on the line 4—4 of Fig. 1.

In the accompanying drawings, I have used the reference numeral 10 to indicate generally a wash-boiler of ordinary construction.

My improved drain pan comprises a bottom member 11 designed to be inclined upwardly and away from the side of the wash-boiler 10. The drain pan has the side members 12 and the back member 13. The side and back members are flared downwardly from the bottom member 11 somewhat, permitting nesting of the device for storage or transportation. The top outer edge of the side and back members and the forward edge of the side members are bent or rolled over at 14 to receive a rod 15 which serves to stiffen and reinforce the upper edge of the drain pan walls. The bottom member 11 is provided at its forward edge with a downwardly extending flange 16, as clearly shown in Fig. 3.

Pivoted to the bottom 11 of the drain pan near the ends thereof on the under side of said botttom, are braces of somewhat peculiar construction. Each brace consists of a horizontal portion 17 mounted in a bearing 18 of the bottom 11. Extending downwardly and forwardly from the portion 17 is a portion 19 which is formed of or connected with a portion 20 bent upwardly in a vertical line for a short distance, thence rearwardly toward the portion 17 at 21, thence upwardly at 22, thence rearwardly at 23. The portions 23 and 17 are inclined slightly upwardly from their forward ends outwardly on a true horizontal line, and the portions 20 are so located and arranged that when the flange 16 is placed on the inside of the upper edge of a boiler side or wall with the member 20 engaging the outside of the boiler wall, then the pan is locked with its bottom inclined from its upper rear edge downwardly and toward the boiler, as illustrated in the drawings and the portions 20 do not interfere with a rim or the like at the top of the boiler.

The brackets, hereinbefore described, are arranged to swing downwardly in the bearing 18, and a similar bearing 18ª on the bottom 11 which receives the member 23. The brackets are arranged with their smaller parts parallel to each other when the device is installed on the boiler. The brackets may swing to position lying in the plane parallel with and adjacent to the bottom of the drain pan.

Secured to the outer surface of each side wall 12, near the front thereof, is a handle member 23. For connecting the brackets with each other while they are in use I have provided an arm comprising the transverse bar 24 having at each end the yoke member 25, adapted to receive the portion 22 of the bracket. The front end of the yoke member 25 is connected with the body of the bar by means of a bolt 26 and a nut 27.

In the manufacture, storage, transportation and use of my improved drain pan, the drain pans are made up and the brackets are pivotally connected with the pans, but the bars 24 are left detached.

For storage or transportation, the pans are nested with the bracket folded flat against the bottom of the pan. The braces 24 may be laid in the bottoms of the pan. It will thus be seen that the pans may be nested and stored in a minimum space when so desired.

When the pans are ready for use for installation, the braces 24 are mounted on the portion 22 of the brackets by means of the bolts 26. The nuts 27 may be screwed tight enough to cause the yoke members 25 to normally grip the portion 22 of the brackets. The drain pan may be installed by placing it above the boiler side and simply lowering it until the upper edge of the boiler side is received between the flange 16 and the brackets. When in use, the clothes or the like may be lifted or placed in the pan with a stick, or any other suitable means and may be allowed to cool until the workman is ready to remove them.

It will be understood that changes may be made in the construction and arrangement of the parts of my improved drain pan without departing from its essential features and purposes, and it is my intent to cover by this application any such changes which may be included within the scope of my claims.

I claim as my invention:

1. A drain pan, having a bottom, end members and a back member, a downwardly inclined flange on the forward end of the bottom member, a pair of bracket members secured to the bottom of said pan and adapted to coact with said flange for securing the drain pan upon the wall of a receptacle for draining into the receptacle, each of said brackets being comprised of alined members pivotally mounted on the bottom of said drain pan, a portion connecting said alined portion including a vertical portion adapted to engage the outside of a receptacle wall, and a vertical portion spaced from said first vertical portion, a connecting brace, a bar for said brackets having at its ends loop members, each having a free end, said loop members being adapted to receive the first described vertical portion of said brackets, and means for securing the free ends of said loop portion to the body of said brace member.

2. A drain pan, open at one side, means at the bottom of said drain pan at the open side thereof for engaging a support, brackets pivoted to the bottom of said pan and adapted to drop by gravity to position for engaging such support and for coacting with said means for supporting said drain pan with its bottom inclined upwardly from its open side, and a detachable brace adapted to be mounted on the pivoted brackets for holding them properly spaced.

Des Moines, Iowa, July 6, 1915.

GEORGE H. ULRICH.

Witnesses:
J. J. KNAPPER,
J. A. HENDERSON.